United States Patent
Sugimoto et al.

(10) Patent No.: US 7,324,324 B2
(45) Date of Patent: Jan. 29, 2008

(54) MULTILAYER ELECTRONIC COMPONENT AND MANUFACTURING METHOD THEREOF

(75) Inventors: Koushiro Sugimoto, Kokubu (JP); Katsuyoshi Yamaguchi, Kokubu (JP); Yumiko Itoh, Kokubu (JP)

(73) Assignee: Kyocera Corporation, Kyoto (JP)

( * ) Notice: Subject to any disclaimer, the term of this patent is extended or adjusted under 35 U.S.C. 154(b) by 42 days.

(21) Appl. No.: 11/090,557

(22) Filed: Mar. 24, 2005

(65) Prior Publication Data

US 2005/0214517 A1 Sep. 29, 2005

(30) Foreign Application Priority Data

Mar. 26, 2004 (JP) .............................. 2004-092774

(51) Int. Cl.
*H01G 4/005* (2006.01)
*H01G 4/228* (2006.01)
(52) U.S. Cl. ................ 361/303; 361/306.1; 361/306.3; 361/307; 361/308.1; 361/321.1; 361/321.2
(58) Field of Classification Search ................ 361/303, 361/306.1, 306.3, 307, 308.1, 308, 321.1–321.5
See application file for complete search history.

(56) References Cited

U.S. PATENT DOCUMENTS 3,757,177 A * 9/1973 Buehler .................... 361/321.4
3,772,748 A * 11/1973 Rutt .......................... 29/25.42
4,030,004 A * 6/1977 Rutt ............................ 361/313
4,875,136 A * 10/1989 Sano et al. ............... 361/321.3
6,195,249 B1 * 2/2001 Honda et al. ............. 361/306.3
6,278,602 B1 * 8/2001 Haratani et al. ............ 361/303
6,331,932 B1 * 12/2001 Kobayashi et al. ....... 361/321.2
6,503,291 B2 * 1/2003 Hosokura et al. ............. 75/351
6,563,689 B2 * 5/2003 Yamamoto ................ 361/306.1
6,606,238 B1 * 8/2003 Nakamura et al. ........ 361/321.2
6,927,966 B2 * 8/2005 Miyazaki et al. ......... 361/321.2
7,042,706 B2 * 5/2006 Nagai et al. ................ 361/305

FOREIGN PATENT DOCUMENTS

JP       09-190946      7/1997
JP       2002-329634    11/2002

* cited by examiner

*Primary Examiner*—Cathy F. Lam
(74) *Attorney, Agent, or Firm*—Hogan & Hartson LLP

(57) ABSTRACT

A multilayer electronic component is composed of a ceramic body obtained by laminating a plurality of ceramic layers via a conductor layer. The conductor layer is a plated film and extracted to one end face of the ceramic body, thereby contributing to the formation of capacity. A peripheral edge portion of the conductor layer composed of the plated film is thicker than its inner region. This avoids stripping on the peripheral edge portion of the conductor layer and avoids internal defects such as delamination. A dummy conductor layer may be formed at a distance on the end opposite the end face for extraction.

17 Claims, 18 Drawing Sheets

33 Grain boundary
31
Dark color shows projecting portion.

MULTILAYER ELECTRONIC COMPONENT AND MANUFACTURING METHOD THEREOF

Priority is claimed to Japanese Patent Application No. 2004-092774 filed on Mar. 26, 2004, the disclosure of which is incorporated by reference in its entirety.

BACKGROUND OF THE INVENTION

1. Field of the Invention

The present invention relates to a multilayer electronic component and a manufacturing method thereof and, in particular, a multilayer electronic component using a plated film as an inner conductor layer laminated together with a ceramic layer, as well as a method of manufacturing the same.

2. Description of Related Art

Recently, to comply with the miniaturization and high performance of electronic components, multilayer electronic components, such as multilayer ceramic capacitors, multilayer actuators, and multilayer inductors, have a tendency to demand a thinner insulator layer and a thinner inner conductor layer. Especially, the conductor layer demands a further reduction in film thickness in order to eliminate a difference in level from an insulator.

Under this circumstance, in some of electronic components, for example, multilayer ceramic capacitors, as is presented in Japanese Patent Application Laid-Open No. 2002-329634, it is proposed to use, as a conductor layer, a metal thin film represented by a plated film and a deposited film that can be thinned more easily, instead of using a conductor paste as has been conventional.

As a solution of eliminating a difference in level between a conductor layer and an insulator on an insulator layer, there is known a multilayer electronic component as described in Japanese Patent Application Laid-Open No. 9-190946. Specifically, in this multilayer electronic component, as shown in FIG. 18, a dummy conductor layer 107 is formed in the same plane as a conductor layer 105 that is formed on the inside of a ceramic body 103 consisting of a plurality of ceramic layers 101. It is described that the occurrence of defects such as delamination is avoidable by forming, at each conductor layer 105, the dummy conductor layer 107 so as to be shifted a predetermined distance with respect to the conductor layer 105.

In a multilayer electronic component described in Japanese Patent Application Laid-Open No. 2002-329634, convex portions are formed on the surface of a conductor layer constituting this multilayer electronic component, and therefore anchor effect to an insulator that is a dielectric layer is increased, thereby increasing the connecting property between the two layers in the vicinity of the convex portions. However, a thin film such as a plated film suffers from the problem that a peripheral edge portion of a metal film is generally susceptible to stripping than an inner region thereof.

This problem also arises in Japanese Patent Application Laid-Open No. 9-190946, in which a dummy conductor layer is formed to eliminate a difference in level due to a conductor layer. Hence, this publication fails to solve the problem that the peripheral edge portion of the metal film is susceptible to stripping than the inner region.

SUMMARY OF THE INVENTION

Accordingly, an advantage of the present invention is to provide a multilayer electronic component that, even when a plated metal thin film is used as a conductor layer to be formed inside, it is capable of preventing stripping (delamination) on the peripheral edge portion of the conductor layer, as well as a method of manufacturing the same.

In one embodiment of the present invention, a multilayer electronic component is composed of a ceramic body that is obtained by laminating a plurality of ceramic layers via a conductor layer. The conductor layer is a plated film and is extracted to one end face of the ceramic body, thereby contributing to the formation of capacity. The peripheral edge portion of the conductor layer composed of the plated film is formed in a greater thickness than its inner region.

In another embodiment of the present invention, a multilayer electronic component is composed of a ceramic body that is obtained by laminating a plurality of ceramic layers via a conductor layer. The conductor layer is extracted to one end face of the ceramic body and contributes to the formation of capacity, and a dummy conductor layer is formed at a distance on the opposite end of the above-mentioned end face for extraction. One or both of the peripheral edge portions of the conductor layer and the dummy conductor layer that are composed of the plated film are formed in a greater thickness than its inner region.

Even if the plated film is so used as the conductor layer, because the peripheral edge portion is formed thick, the amount of this thickness acts as anchor to the ceramic layer, thereby preventing the conductor layer from stripping from the ceramic layer. Further, the warping and distortion of the conductor layer due to a difference in level produced by the thickness of the conductor layer can be suppressed by the presence of the dummy conductor layer adjacent to the conductive layer of the plated film that contributes to the formation of capacity.

A first method of manufacturing a multilayer electronic component according to the present invention basically includes: the step of forming a plurality of conductor patterns; the step of forming a ceramic green sheet by applying a ceramic slurry on the conductor patterns; the step of forming a laminate body, in which the conductor pattern and the ceramic green sheet are alternately laminated, by laminating the ceramic green sheet having the conductor patterns; and the step of forming a ceramic body by cutting and firing the laminate body. The conductor patterns are formed by: (i) forming a mask pattern having openings for forming conductor patterns arranged at a distance in at least one direction, on a metal member on which a mold releasing layer is formed; (ii) electroplating on the metal member; and (iii) transferring the obtained plated film onto a substrate. The ceramic green sheets are laminated while alternately shifting the positions of the distance between the conductor patterns. The laminate body is cut at the midpoint of the distance so as to divide the distance into two.

A second method of manufacturing a multilayer electronic component according to the present invention includes the same basic steps as the first method. The conductor patterns are formed through the above-mentioned steps (i) to (iii). The ceramic green sheets are laminated while alternately shifting the positions of the distance between the conductor patterns. The laminate body is cut at the conductor pattern portion except for the region of the distance.

Since the mask pattern is previously disposed at the region where the plated film is not formed, when forming the metal film by electroplating method, the plated film can grow so as to climb up the wall of the openings of the mask pattern, thereby forming the peripheral edge portion of the plated film in a greater thickness than its inner region.

Additionally, with the mold releasing layer previously formed on the surface on which the plated film is formed, it is possible to provide good peeling property from the metal member even when the formed plated film is transferred to, for example, other substrate such as a ceramic green sheet. In particular, since the conductor patterns are the plated film, there arises no bleeding during formation, unlike the case of using a conductor paste. This permits a small distance between the above-mentioned patterns, thereby locating the conductor patterns adjacent to each other.

When the conductor patterns so obtained are used as the conductor layer of a multilayer electronic component, the conductor layers are arranged adjacent to each other, thereby producing the effect similar to that when a layer for eliminating distances is disposed on the circumference of the conductor layer. Therefore, when the conductor patterns are laminated into multiple layers together with the ceramic green sheets, the deformation of the inner conductor layer is avoidable, thereby suppressing delamination after cutting and firing.

Since the ceramic slurry is applied onto the plated film to form the ceramic green sheet, the ceramic green sheet can be formed on the plated film so as to follow the irregularities thereon, thus exhibiting good followability. This increases the adhesion between the two layers, thereby suppressing the occurrence of delamination.

Other advantages of the present invention will be apparent from the following description.

DESCRIPTION OF PREFERRED EMBODIMENTS

<Structure of Multilayer Electronic Component>

A multilayer ceramic capacitor that is typical of multilayer electronic components of the present invention will next be described in detail.

Figure 1:
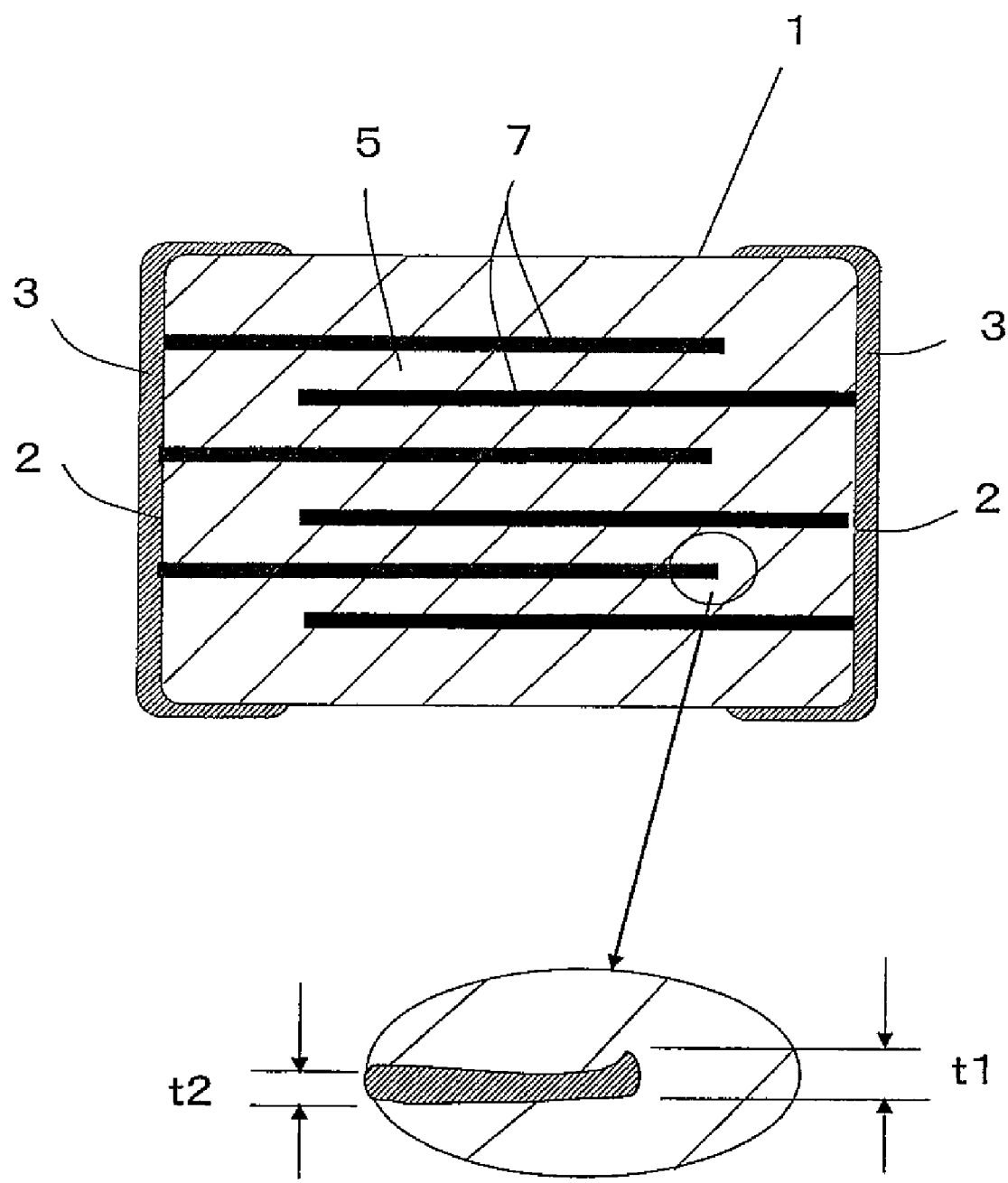
FIG. 1 is a schematic sectional view showing one example of a multilayer ceramic capacitor according to the present invention.

FIG. 1 is a schematic sectional view of a multilayer ceramic capacitor according to the present invention. In this multilayer ceramic capacitor, external electrodes 3 are formed on opposite end faces of a ceramic body 1 in the shape of a rectangular solid. The ceramic body 1 is constructed by laminating a plurality of ceramic layers 5. Disposed on the ceramic layer 5 is a plated conductor layer 7 in substantially the same shape as the ceramic layer 5, which is extracted to an end face 2 of the ceramic body 1 and contributes to the formation of capacity.

Figure 2:
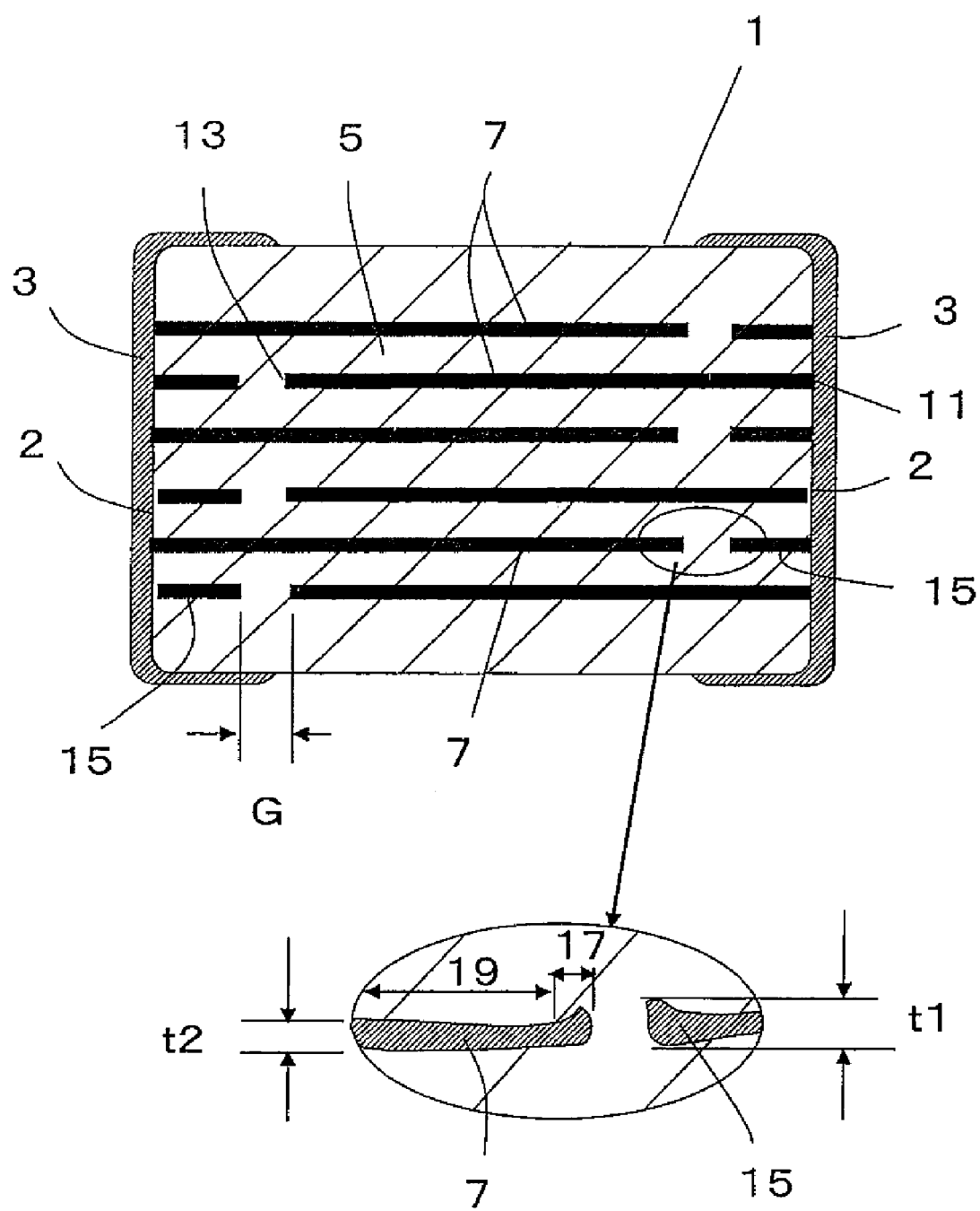
FIG. 2 is a schematic sectional view showing one example of a multilayer ceramic capacitor having plated dummy conductor layers according to the present invention.

FIG. 2 is a schematic sectional view of a multilayer ceramic capacitor having plated dummy conductor layers according to the present invention. In this multilayer ceramic capacitor, on the same plane as the plated conductor layer 7, plated dummy conductor layers 15 that do not contribute to the formation of electrostatic capacity are disposed at a distance G from an end portion 13 of the plated conductor layer 7, which is on the opposite side of an end portion 11 to be extracted to the end face 2 of the ceramic body 1.

In this multilayer electronic components, it is important that peripheral edge portions 17 of either one or both of the plated conductor layers 7 and the plated dummy conductor layers 15 are formed in a greater thickness than their inner region 19.

Referring now to partially enlarged views in FIGS. 1 and 2, the ratio of t1/t2, wherein t1 is the thickness of the peripheral edge portion 17, and t2 is the thickness of the inner region 19, is preferably not less than 1.1, particularly not less than 1.2, in order to increase anchor effect. On the other hand, the ratio of t1/t2 is preferably not more than 1.4, particularly not more than 13, in order to avoid a drop in insulation resistance and short circuit due to continuity throughout the ceramic layer 5. The thickness of the plated conductor layer 7 and the plated dummy conductor layer 15 is preferably not more than 1 μm, particularly not more than 0.8 μm, in order to achieve high-degree lamination of multilayer ceramic capacitor and eliminate a distance in level on the conductor layers (hereinafter corresponding to the plated conductor layers and the plated dummy conductor layers).

In contrast, when the thickness of the peripheral edge portions 17 of the conductor layers 7 and 15 is substantially the same as their respective inner regions 19, or smaller than the regions 19, there is no anchor effect of the peripheral edge portions 17, and the connecting force between the ceramic layer 5 and the conductor layers 7 and 15 is small, thus causing delamination.

Figure 3:
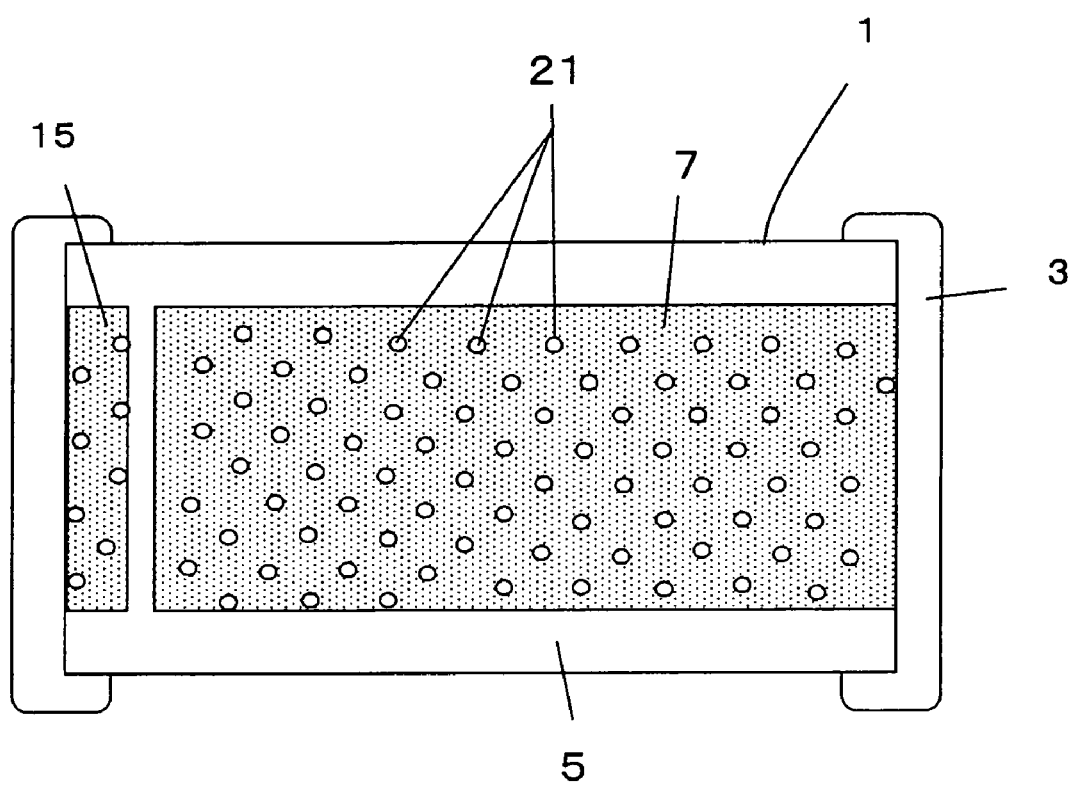
FIG. 3 is a plan view of conductor layers made of a plated film having openings.

FIG. 3 is a plan view of plated-film conductor layers having openings. Preferably, a plated-film conductor layer 7 and a plated-film dummy conductor layer 15 have openings 21. The shape of the openings 21 may be substantially circle or polygon. Since the convex portions of ceramic particles can be fit in the openings 21, it is possible to further increase the anchor effect between the ceramic layer 5 and the conductor layers 7 and 15. The maximum diameter of the openings 21 is preferably not more than 30 μm, in order to produce satisfactory effect as the electrode contributing to the electrostatic capacity of the conductor layers 7 and 15. On the other hand, it is preferably not less than 5 μm, in order to ensure the anchor effect due to the openings 21.

As the metal constituting the conductor layers 7 and 15, metals such as Cu, Ni, Ag, Pd, and Au, or these alloys are desirable in view of the sintering temperature and high conductivity of conductor material. Especially in view of prices of metals, Cu and Ni are suitable, particularly Ni, for simultaneous firing along with dielectric material of high capacity.

Figure 4:
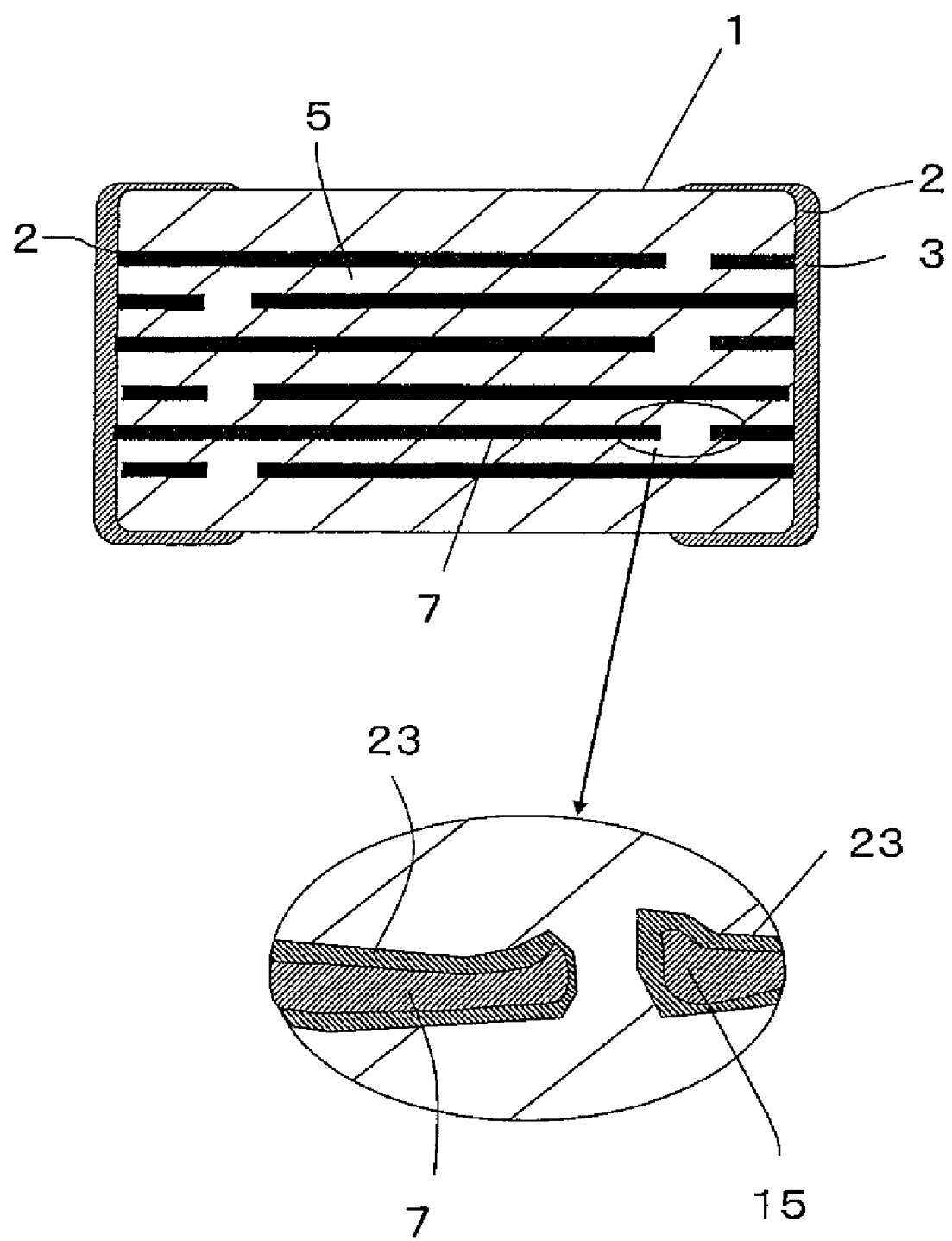
FIG. 4 is a partial schematic sectional view showing a conductor layer, on the surface of which a metal oxide film is formed.

FIG. 4 is a partial schematic sectional view showing conductor layers, on the surface of which a metal oxide film is formed. A metal oxide film 23 is preferably formed on the surfaces of the plated-film conductor layers 7 and the plated-film dummy conductor layers 15. The connecting property to the ceramic layer 5 composed of a metal oxide can further be increased by the presence of the metal oxide film 23 on the surface of the conductor layers 7 and 15. In view of the adhesion between the conductor layers 7, 15 and the metal oxide film 23, and also the ease of formation, the metal oxide film 23 is preferably an oxide film of the main component of the conductor layers 7 and 15. Alternatively, an oxide film of other metal may be formed on the surfaces of the conductor layers 7 and 15. The thickness of the metal oxide film 23 is preferably not less than 0.1% of the entire thickness of the conductor layers 7, 15, in order to increase the connecting property to the ceramic layer 5, and in order to ensure the effective thickness of the conductor layers 7 and 15, and also increase conductivity.

For instance, an oxide film of other metal is preferably composed of a non-oxide such as nitride, carbide, or boride of an element constituting the ceramic layer 5. Such a non-oxide has conductivity, and it is therefore possible to suppress a decrease of the effective area of the conductor layers 7 and 15, and also a deterioration of the dielectric property of the ceramic layer 5, for example. At the same time it is possible to increase the connecting property between the conductor layers 7, 15 and the ceramic layer 5, thereby preventing delamination. When barium titanate is used as the main component of the ceramic layer 5, a suitable non-oxide is Ti on B site, which is the element constituting barium titanate, and Ti is also suitable in view of conductivity because it has reduction property.

Figure 5:
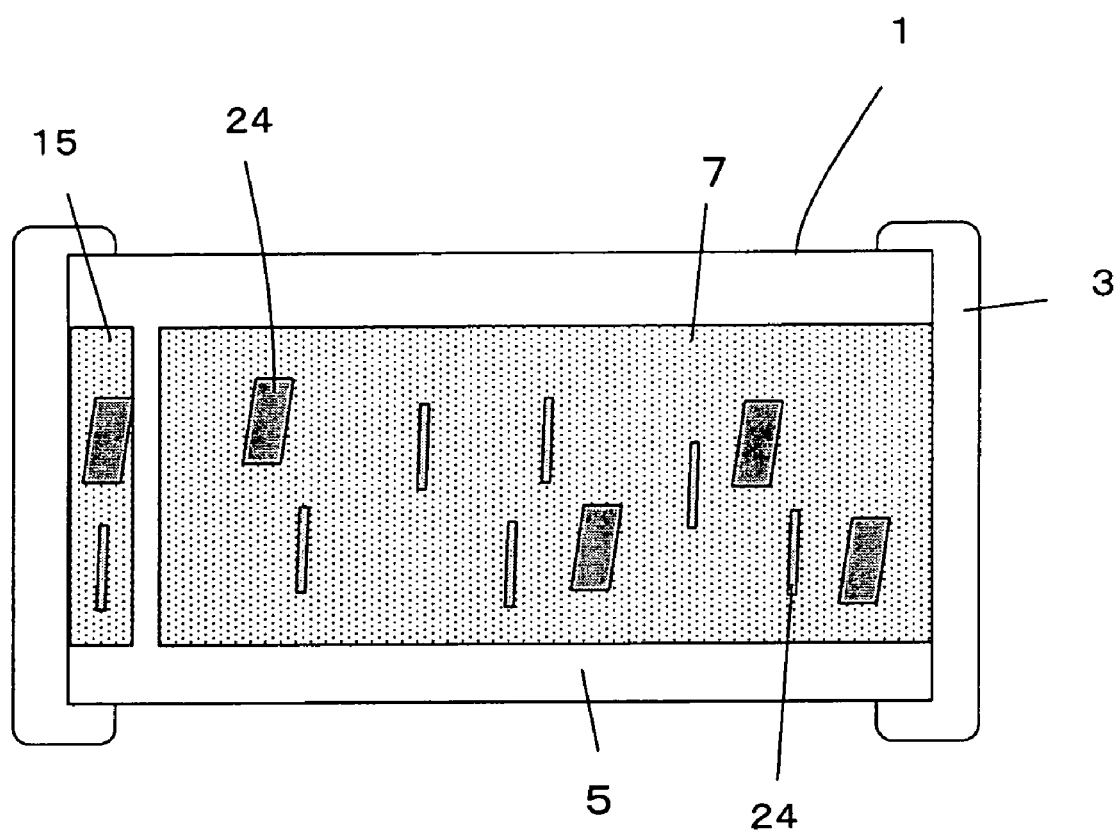
FIG. 5 is a partial schematic plan view showing a conductor layer having anisotropic crystals at least on the surface thereof.

FIG. 5 is a partial schematic plan view showing a conductor layer having anisotropic crystals at least on the surface. In order to increase the anchor effect to the ceramic layer 5, as above described, anisotropic crystals 24 are preferably present on the surfaces of the plated-film conductor layer 7 and the plated-film dummy conductor layer 15. For instance, when acicular crystals being a metal composition of the conductor layers 7 and 15 are present on their surfaces, these pointed crystals act as anchor, thereby further increasing the connecting force with respect to the ceramic layer 5. The anisotropic crystals 24 may have any shape, from which anchor effect can be expected. Examples are angular shapes at first glance, such as acicular shape and squarish shape.

Figure 6:
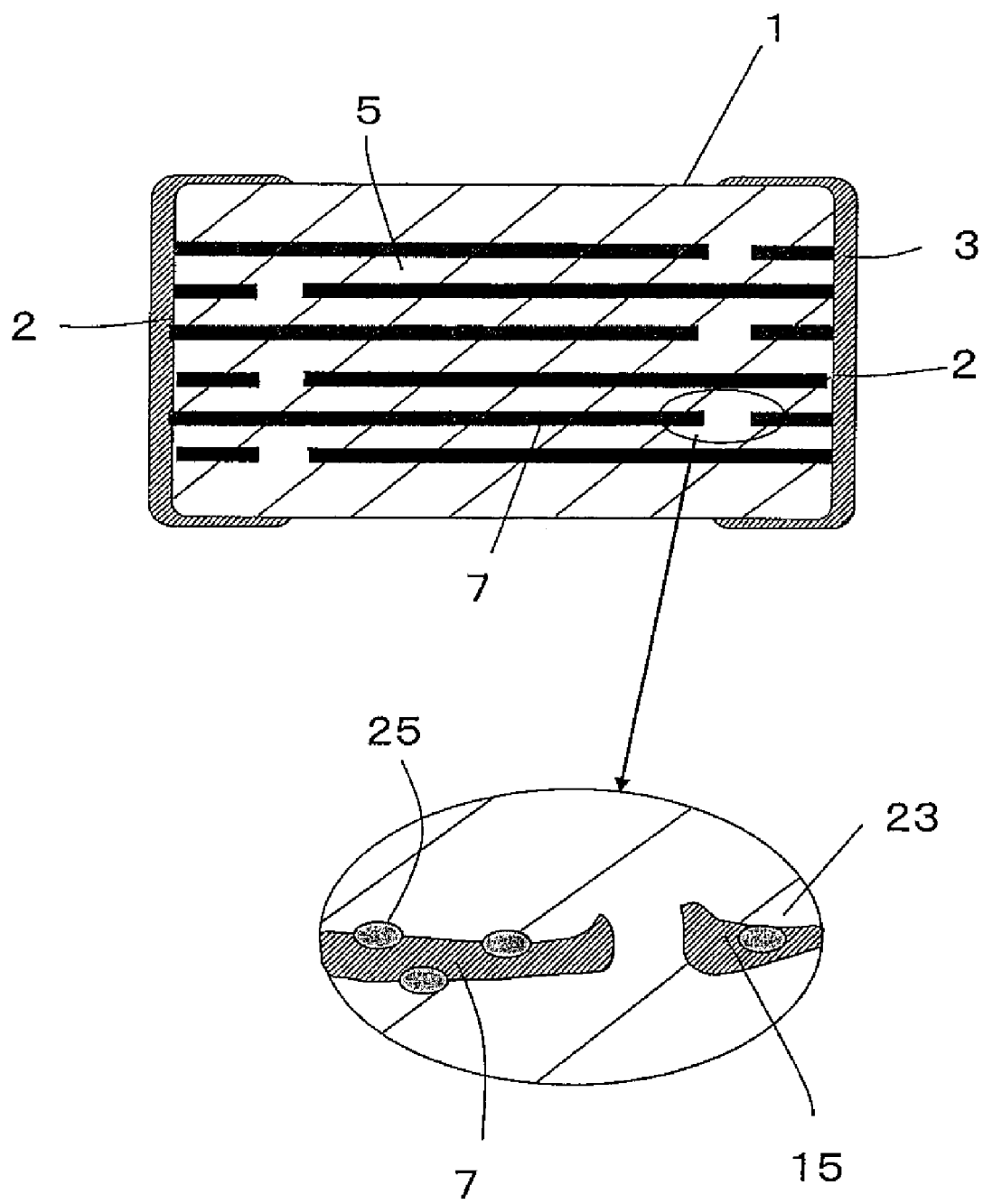
FIG. 6 is a partial schematic sectional view showing a conductor layer containing, at least in the interior, at least one of insulative particles, semiconductor particles and conductive particles.

FIG. 6 is a partial schematic sectional view showing a conductor layer containing, at least in the interior, at least one of insulative particles, semiconductor particles and conductive particles. Preferably, the plated-film conductor layer 7 and the plated-film dummy conductor layer 15 contain therein at least one of insulative particles, semiconductor particles and conductive particles (hereinafter, the three types of particles are generally indicated by reference numeral 25). That is, if the conductor layers 7 and 15 have particles 25 in their respective surfaces, irregularities can be formed like the above-mentioned anisotropic crystals, thereby increasing the anchor effect of the ceramic layer 5 with respect to the sintered surface.

Preferably, the maximum particle sizes of the insulative particle, semiconductor particles and conductive particles are smaller than the maximum thickness of the plated-film conductor layer 7 and the plated-film dummy conductor layer 15. The total content of the insulative particles, semiconductor particles and conductive particles in the plated-film conductor layer 7 and the plated-film dummy conductor layer 15 is preferably 1 to 50 (area %), more preferably 5 to 15 (area %), when the conductor layers 7 and 15 are viewed from above. In other words, the rate of the area of the particles to the area of the conductor layers 7 and 15 is preferably 1 to 50%. As above described, the presence of the particles 25 in the conductor layers 7 and 15 increases the contact points between the ceramic layer 5 and the conductor layers 7, 15. On the other hand, the limitation of the content of the particles 25 ensures high conductivity as electrode by nature, thereby producing excellent characteristics of a multilayer electronic component.

Among various ceramic powders, particularly desirable insulative particles are ones that contain at least ceramic particles constituting the ceramic layer 5. The maximum size of insulative particles is preferably smaller than the thickness of the conductor layers 7, 15. The particle size of the insulative particles may be such a dimension that they penetrate the conductor layer and connect to the ceramic layer.

Examples of semiconductor particles are ceramic particles previously subjected to reduction, and metal powder partially subjected to oxidation. In this case, the constituent of the ceramic layer 5, or the component of the conductor layers 7 and 15, or the particles composed of these mixtures can be used suitably. A proper dimension (the maximum diameter) of semiconductor particles may be such a dimension that they penetrate the conductor layers 7 and 15. Alternatively, they may bite into a range smaller than one half of the thickness of the ceramic layer 5.

Conductive particles are preferably ones which have the same component as the conductor layers 7 and 15, or ones which have a higher melting point than the metal component of the conductor layers 7 and 15, and cause less lowering of melting point even if made into an alloy. Preferably, these conductive particles have less influence on the dielectric property of the ceramic layer 5 to be sintered at the same time. The dimension of conductive particles is preferably about the same as the above-mentioned semiconductor particles, especially in order to maintain the insulation performance of the ceramic layer 5. Alternatively, these conductive particles may contain the component of the ceramic layer 5 and become such a column-like organization that penetrates the conductor layers 7, 15 and bonds the ceramic layer 5.

Figure 7:
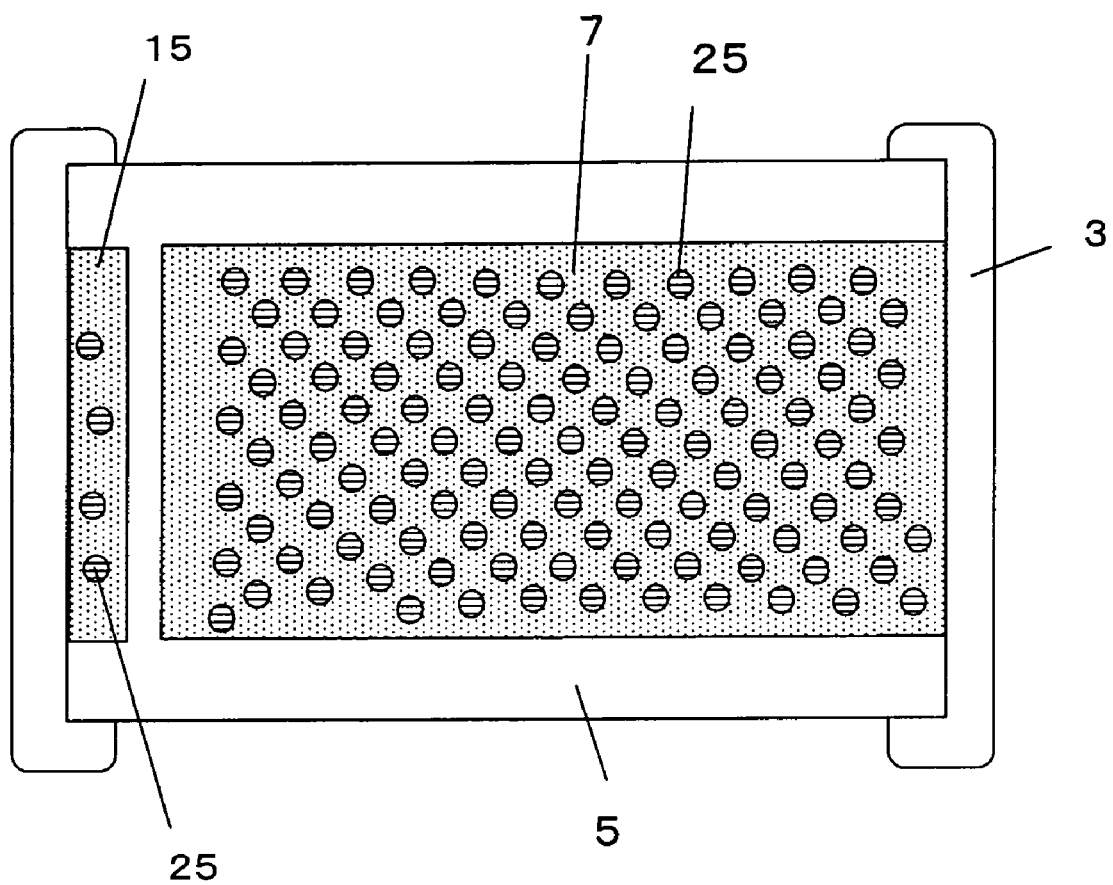
FIG. 7 is a partial schematic plan view showing the same conductor layer as in FIG. 6, which contains, at least in the interior, at least one of insulative particles, semiconductor particles and conductive particles.

FIG. 7 is a partial schematic plan view showing conductor layers 7 and 15 containing, at least in the interior, at least one of insulative particles, semiconductor particles and conductive particles. The total content of the insulative particles, semiconductor particles and conductive particles in the plated-film conductor layer 7 and the plated-film dummy conductor layer 15 is preferably 1 to 50 (area %) when the conductor layers 7 and 15 are viewed from above.

The surface roughness Ra of the conductor layers 7 and 15, except for the increment in thickness of the peripheral edge portions 17, is preferably not less than 20 nm in order to ensure anchor effect. While it is preferably not more than 100 nm in order to increase the adhesion property to the ceramic layer 5.

As the materials of the ceramic layer 5 constituting the multilayer ceramic capacitor of the present invention, there are for example ones which are suitable, as dielectric layer, in view of characteristics such as high dielectric constant, high temperature characteristic, and voltage dependency, and which permit simultaneous firing with the conductor layers 7 and 15. Specifically, a high insulative material comprising mainly barium titanate is desirable, and its thickness is preferably not more than 3 μm, because it is possible to increase the electrostatic capacity of the multilayer ceramic capacitor and also achieve high-degree lamination.

Figure 8:
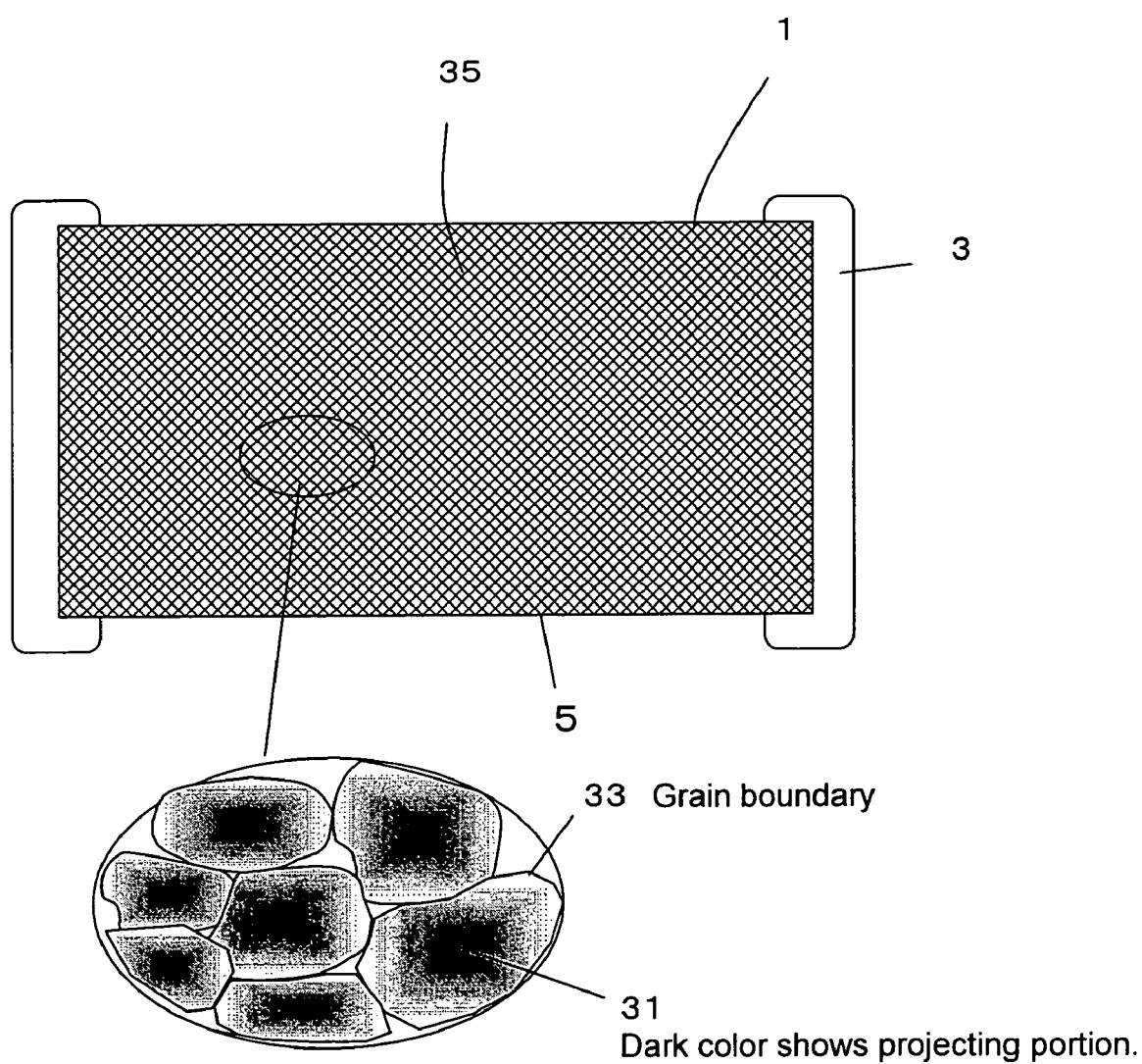
FIG. 8 is a plan view showing the surface state of a ceramic layer.

FIG. 8 is a plan view showing the surface state of a ceramic layer 5. The ceramic layer 5 is preferably one in which a large number of ceramic particles 31 (Projecting portions are shown in dark color in FIG. 8) join via grain boundaries 33 so as to have a sintered surface 35. The mean particle size of ceramic particles in the sintered surface 35 is preferably not more than 0.5 μm. In particular, it is desirable that the sintered surface 35 of the ceramic layer 5 projects from a reference plane given by method of least squares of the grain boundaries 33 surrounding the ceramic particles 31. It is more desirable that the height of the projection is 0.01 μm or more from the reference plane. In other words, a small particle size of ceramic particles constituting the ceramic layer 5 enables to form a large number of irregularities of the sintered surface. It is therefore possible to further increase anchor effect even if there is a limit on the height of projection of ceramic particles.

<Manufacturing Method of Multilayer Electronic Components>

Figure 9:
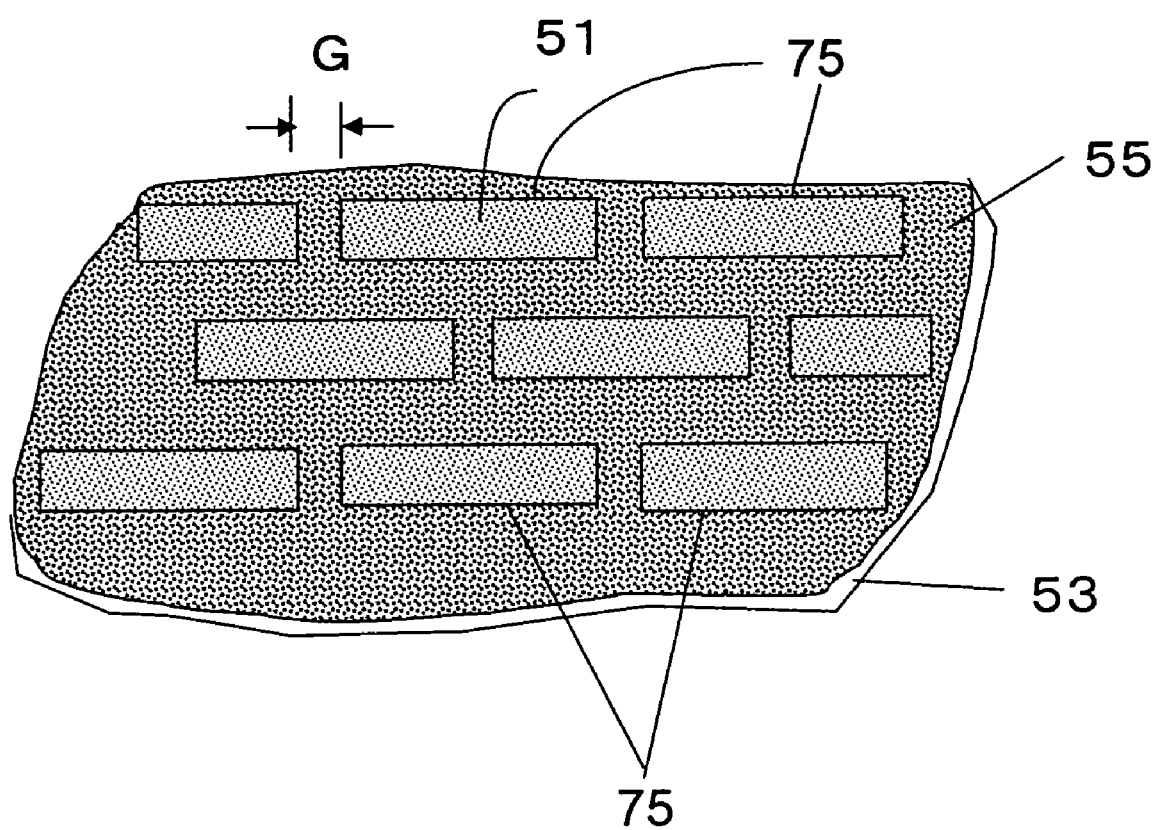
FIG. 9 is a schematic diagram showing a metal member with a mold releasing layer and mask patterns for forming a plated film (metal film) ("Step A")

FIG. 9 is a schematic diagram showing the region of a portion of a metal member with a mold releasing layer 51 and a mask pattern 55, in order to form a plated-film conductor layer (metal film).

Step A:

A mask pattern 55, in which a plurality of openings 75 are arranged in a width of a distance G in at least one direction, is formed on a metal member 53, on which a mold releasing layer 51 is previously formed. For example, the material of the metal member 53 is preferably a metal plate to which plating is applied, or a corrosion-resistant one, such as stainless steel. The material of the mold releasing layer 51 is preferably TiN, because of high conductivity and high mold releasing property of a plated film. To function as a conductor during electroplating, the specific resistance of the mold releasing layer 51 is preferably $10^{-5}$ to $10^{-3}$ Ωcm. The material of the mask pattern 55 is preferably diamond like carbon (DLC), graphite like carbon (GLC), etc., because it exhibits sufficient insulation performance with a relatively small layer thickness and is excellent in stripping property.

Since the above-mentioned crystalline film of TiN etc. is disposed as the mold releasing layer 51, on the surface of which a plated film is formed, it is possible to deposit, for example, anisotropic crystals composed of a metal composition constituting the conductor layers 7 and 15, on the surfaces of the after-firing conductor layers 7 and 15. When the above-mentioned diamond like carbon (DLC) or graphite like carbon (GLC) is used as the mask pattern 55 in the presence of the mold releasing layer 51, a plated film can be formed such that it climbs up along the side surfaces of the mask pattern 55. This leads to a conductor pattern, the peripheral edge portion of which has a large thickness. The mask pattern 55 is formed such that a portion of the mold releasing layer 51 is left only at the area for forming a plated film that becomes the conductor patterns. In this case, if the conductor pattern has a rectangular shape, a shorter side adjacent in a longer side direction is disposed at a distance G. The distance G is preferably not more than 300 μm.

Step B:

Subsequently, on the metal member 53 on which the mask pattern 55 and the mold releasing layer 51 are formed, for example, Ni is electroplated to form a metal film being a plated film on the region of the openings 75, except for the mask pattern 55 on the metal member 53.

Figure 10:
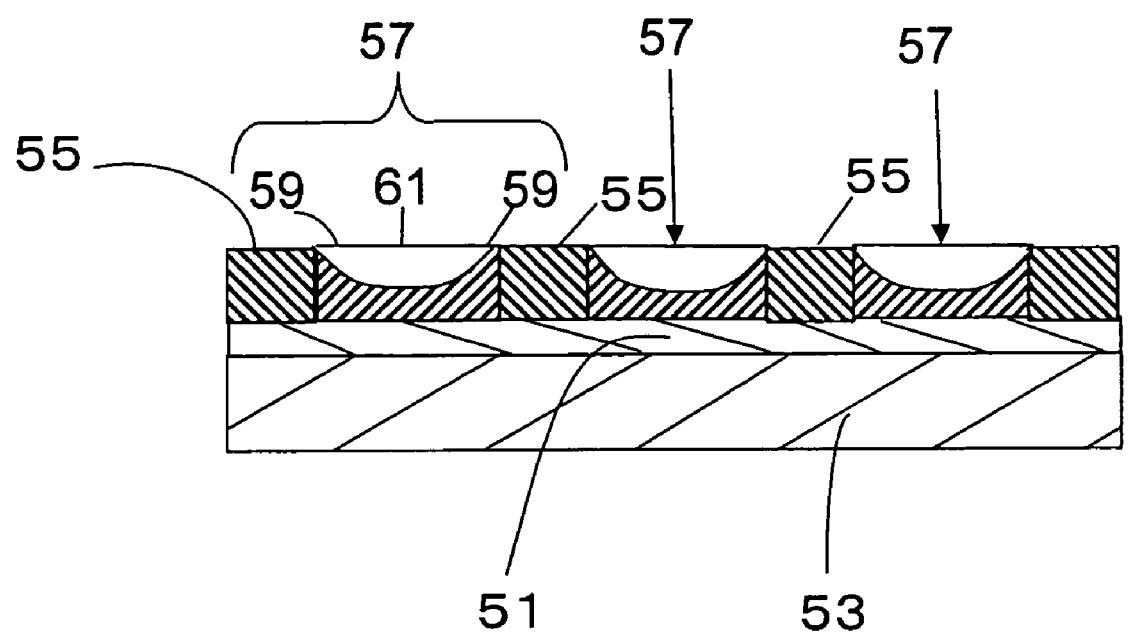
FIG. 10 is a sectional view of conductor patterns made of a plated film.

FIG. 10 is a sectional view showing plated-film conductor patterns 57. As shown in FIG. 10, in the conductor patterns 57, a peripheral edge portion 59 swells along the peripheral surface of the opening 75 of the mask pattern 55, resulting in thicker than an inner region 61.

Figure 11A:
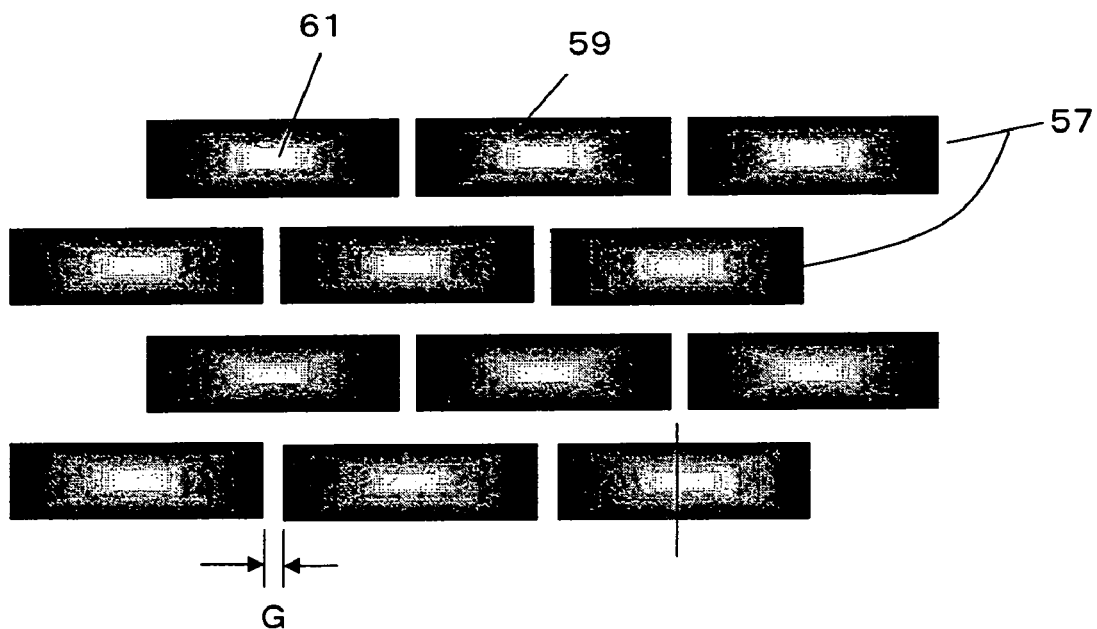
FIG. 11A is a plan view showing conductor patterns in which a distance between the conductor patterns is present at the center in a longer side direction ("Step B")
Figure 11B:
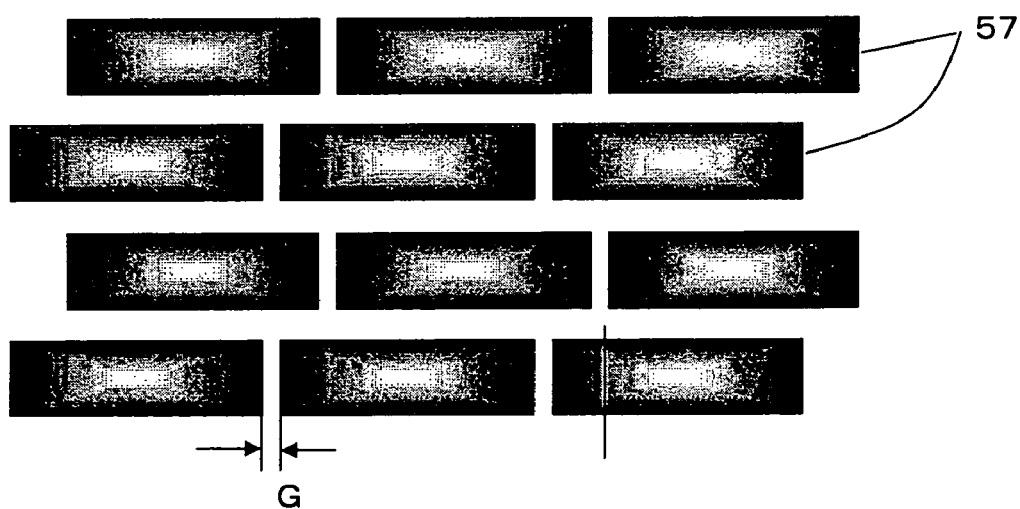
FIG. 11B is a plan view showing conductor patterns in which a distance between the conductor patterns is present at a position drifted from the center in a longer side direction ("Step B")

FIG. 11A is a plan view showing conductor patterns made of a plated film. The pattern is produced in such a staggered arrangement that respective patterns 57 have a rectangular shape with a distance G in its longitudinal direction, and the patterns 57 and those orthogonal to the longitudinal direction are mutually shifted in the longitudinal direction. The present invention may employ either one of the instances: the space of a distance G between the conductor patterns 57 is present at the center in a longer side direction (FIG. 11A); and the space of a distance G between the conductor patterns 57 is present at a position drifted from the center in a longer side direction (FIG. 11B).

In the present invention, as shown in FIG. 10, it is important that the peripheral edge portion 59 of the conductor pattern 57 has a greater thickness than the inner region 61. By using the conductor patterns of this shape as the conductor pattern for manufacturing a multilayer ceramic capacitor, the amount of the thickness of the peripheral edge portion 59 becomes anchor to a ceramic green sheet, thereby increasing the adhesion with respect to the ceramic green sheet. In other words, when the thickness of the peripheral edge portion 59 is the same as or smaller than that of the inner region 61, the above-mentioned anchor effect is not produced, and therefore the adhesion to a ceramic green sheet is low, thus susceptible to delamination. The thickness of the conductor patterns 57 is preferably not more than 1

μm, particularly not more than 0.8 μm. Preferably, the distance G in the longer side of the conductor patterns 57 is either smaller one of: 1 to 50 times of the thickness of a ceramic green sheet to be described later; and not more than 100 μm.

Figure 12:
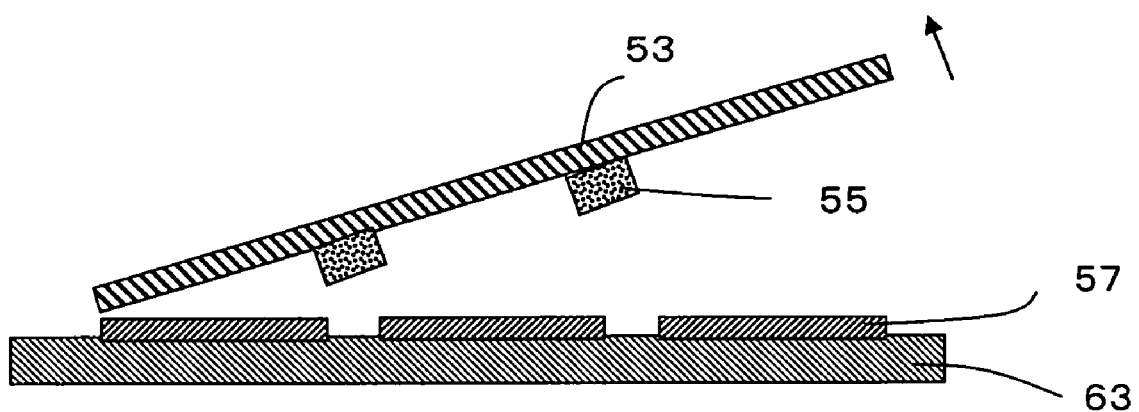
FIG. 12 is a schematic diagram showing the step of transferring conductor patterns ("Step C")

Step C:

Subsequently, the conductor patterns 57 disposed on the metal member 53 is transferred to and formed on a substrate 63. FIG. 12 shows the step of transferring conductor patterns. The pattern arrangement in this case is in the reflected image relationship with the state of being formed on the metal member 53.

Figure 13:
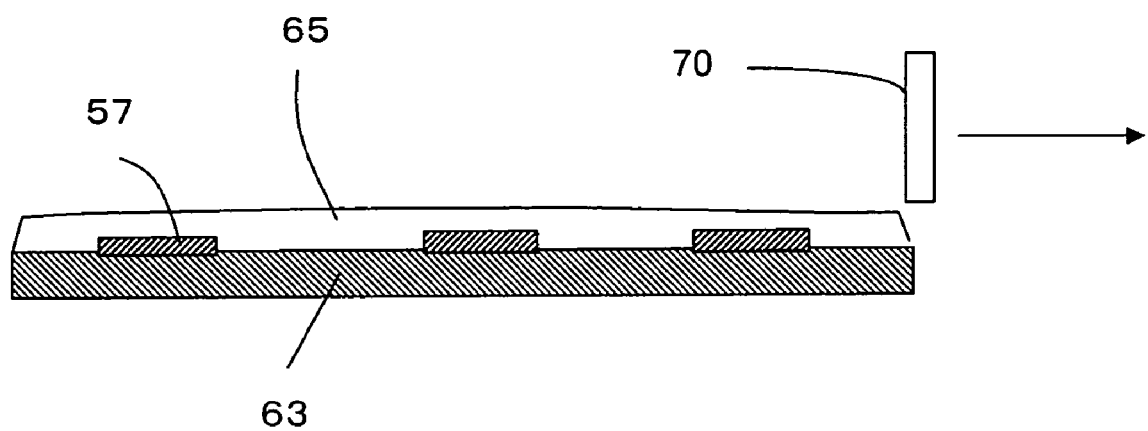
FIG. 13 shows the step of forming a ceramic green sheet on conductor patterns ("Step D")

Step D:

Then, a ceramic slurry is applied by using a doctor blade 70 or the like, onto the substrate 63 containing the conductor patterns 57, thereby forming a ceramic green sheet 65. FIG. 13 shows the step of forming the ceramic green sheet 65 on the conductor patterns 57. Here, the direction in which the ceramic slurry is applied to the conductor patterns 57 in the shape of a rectangle is preferably a perpendicular direction to the longitudinal direction of the conductor patterns 57. The perpendicular application produces the effect of damming up the conductor patterns 57, and the space therebetween is easily filled with the ceramic slurry. As the forming conditions, the application speed is preferably set to the range of 10 to 200 m/min. Under this condition, the above-mentioned dam effect is produced. As the substrate 63, polyethylene terephthalate (PET) film is suitable from the point of view of mechanical strength, resistance to solvent etc. contained in the ceramic slurry, and flexibility.

The ceramic slurry is prepared by blending a predetermined amount of organic binder, solvent and dispersing agent, into ceramic raw material powder comprising mainly barium titanate, for example, and then adjusting to a predetermined viscosity. Since this invention employs a base metal as the conductor layers 7 and 15 to be formed in the interior of the multilayer ceramic capacitor, the ceramic powder constituting the ceramic layer 5 is preferably a dielectric material excellent in resistance to reduction. Forming is suitably performed with a known coater, for example, a doctor blade, from the point of view of forming a thin layer and achieving a uniform thickness of application. The mean particle size of the ceramic powder is preferably not more than 0.5 μm, in order to thin the ceramic green sheet 65, and also facilitate the powder to enter the after-firing conductor layers 7 and 15, thereby improving the connecting property between the two layers. Specifically, with this forming method, the ceramic layer 5 is brought into the state in which a large number of ceramic particles 31 join via grain boundaries 33, thereby attaining a sintered surface 35. As a result, the plated-film conductor layer 7 or the plated-film dummy conductor layer 15 follows and adheres to the sintered surface 35 of the ceramic layer 5.

The miniaturization of the particle size of ceramic powder facilitates thinning of the ceramic green sheet 65 and hence achieving thin and high-degree lamination. As used herein, the term "follows and adheres to" means that a plated film adjoins along the shape of ceramic particles existing on the surface of the ceramic layer 5. Specifically, this is the state in which the plated film composition adjoins to such an extent that it is embedded in the holes of the ceramic layer 5. In other words, the sintered surface 35 of the ceramic layer 5 can be formed so as to project from a reference plane given by method of least squares of the grain boundaries 33 surrounding the ceramic particles 31. Here, the thickness of the ceramic green sheet 65 is preferably not more than 2.5 μm, particularly not more than 2 μm, in order to achieve thin and high-degree lamination of the ceramic layer 5 for use in a multilayer ceramic capacitor.

Figure 14:
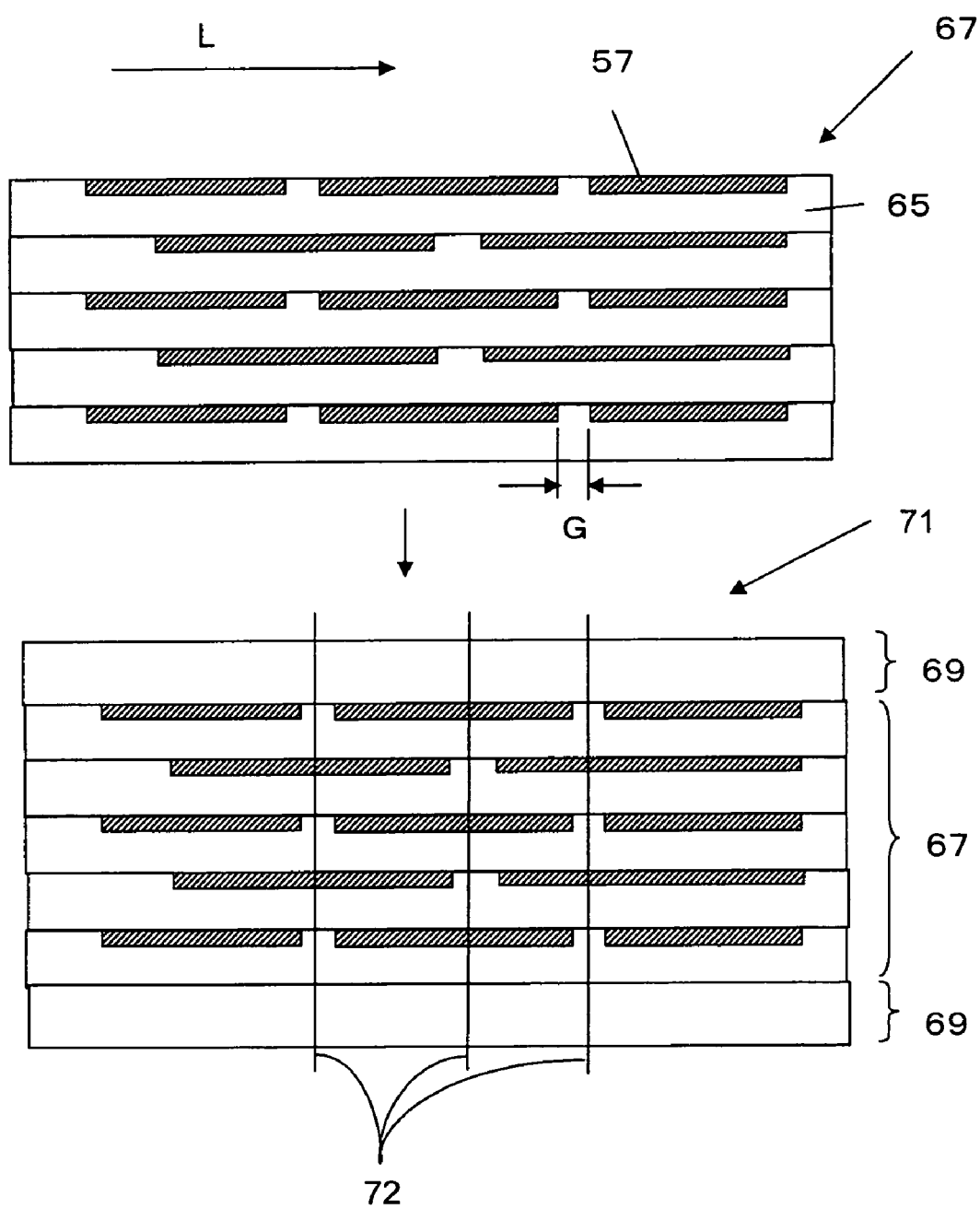
FIG. 14 is a sectional view showing a laminate body in which the portions of distances are overlapped at the center in a longer side direction of conductor patterns, in the forming step and the cutting step of the laminate body ("Step E", "Step F")
Figure 15:
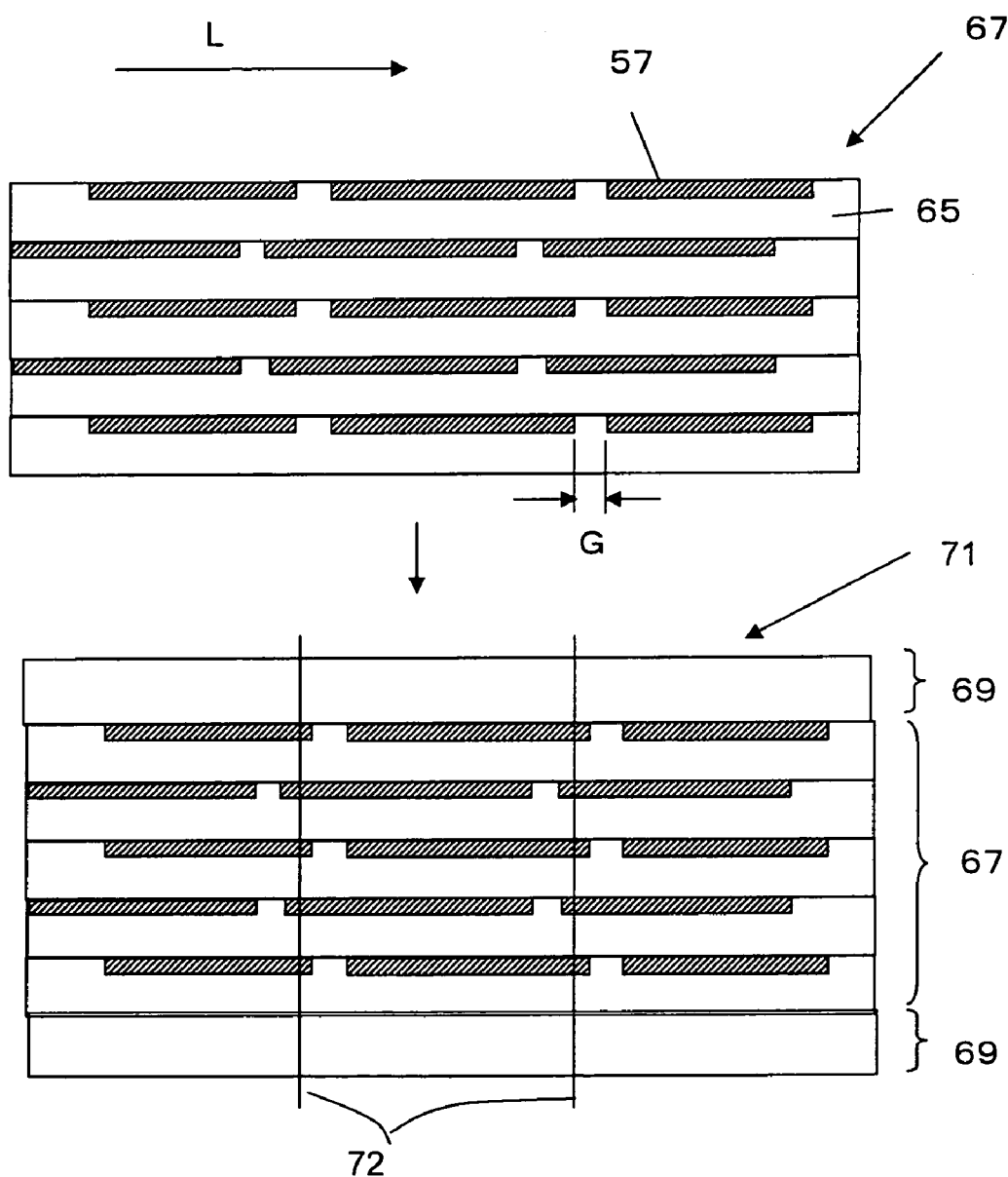
FIG. 15 is a sectional view showing a laminate body in which the portions of distances are overlapped at a position drifted from the center in a longer side direction of conductor patterns, in the forming step and the cutting step of the laminate body ("Step E", "Step F")

Step E and Step F:

Subsequently, as shown in FIG. 14 or FIG. 15, a sheet in which a ceramic green sheet 65 is formed on the conductor patterns 57 (herein, referred to as a "conductor-embedded ceramic green sheet") is sequentially laminated while stripping a substrate 63, thereby forming an effective laminate body 67. At this time, the conductor patterns 57 line up in the position of a longer side with respect to the direction of the lamination (not shown), while the shorter side of the conductor patterns 57 are stacked such that the position of distances G of respective layers are alternately shifted. Next, a plurality of ceramic green sheets 65 having no conductor patterns 57 are laminated above and below the effective laminate body 67, and an external cover layer 69 is disposed thereon, thereby forming a laminate body 71. The number of laminated layers is preferably not less than 200, particularly not less than 300 for a small high-capacity multilayer ceramic capacitor.

FIGS. 14 and 15 show the step of forming a laminate body and the step of cutting the laminate body, respectively. Specifically, FIG. 14 is a sectional view showing a laminate body in which the portions of distances G are overlapped at the center in a longer side direction of conductor patterns. FIG. 15 is a sectional view showing a laminate body in which the portions of distances G are overlapped at a position drifted from the center in a longer side direction of conductor patterns. More specifically, FIG. 14 illustrates the case of preparing a green body of a capacitor having only plated conductor patterns that contribute to electrostatic capacity. FIG. 15 illustrates the case of disposing plated dummy conductor patterns with a distance G interposed therebetween, on plated conductor patterns that contribute to electrostatic capacity.

Figure 16A:
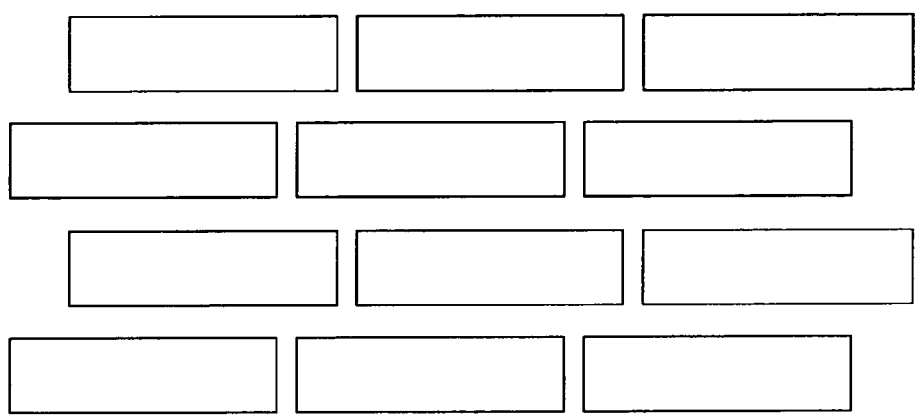
FIG. 16A is a plan view of a plane of conductor patterns.
Figure 16B:
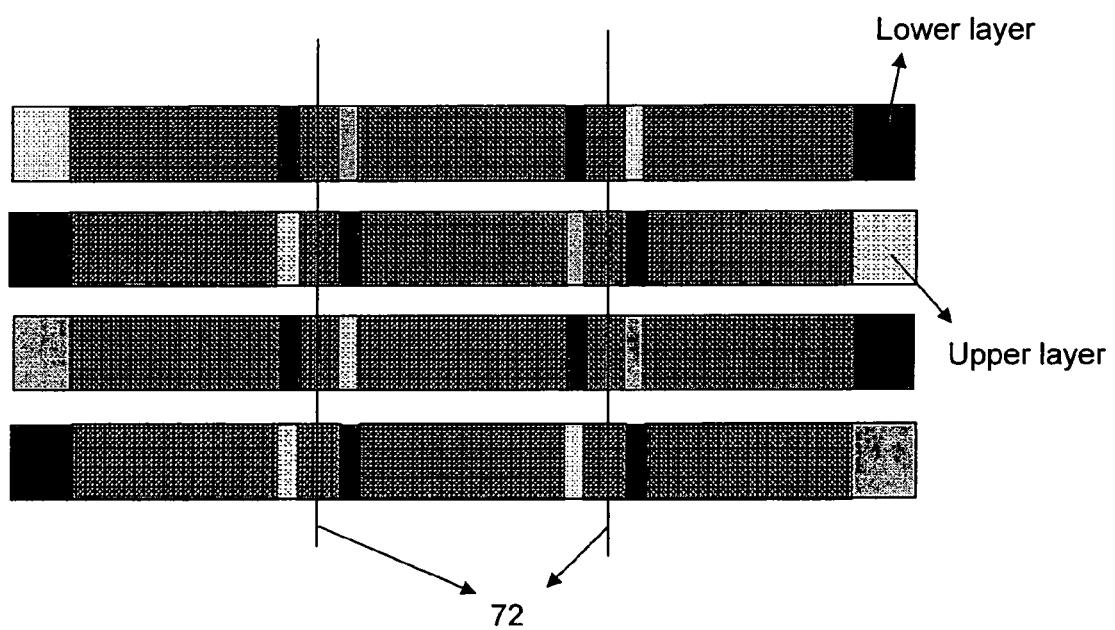
FIG. 16B is a perspective view when a plurality of conductor patterns are stacked into multiple layers.

The laminate body is integrated by temporarily pressing under laminating conditions, for example, at a temperature of 50 to 70° C., and a pressure of 0.7 to 1.1 MPa, followed by pressing with a known hydrostatic pressurizer. Preferably, hydrostatic pressing conditions are at a temperature of 60 to 80° C., and a pressure of 40 to 70 MPa. Subsequently, the laminate body 71 so prepared is cut. A desirable cutting method is, for example, a dicing saw that can perform continuous cutting and exhibit good cutting property to the laminate body 71. The laminate body 71 is cut along the cutting-plane lines illustrated in FIGS. 14 and 15. FIGS. 16A and 16 are plan views illustrating cutting-plane lines 72 of the laminate body in FIG. 15, on the conductor patterns. Specifically, FIG. 16A is a plan view of a plane of conductor patterns. FIG. 16B is a perspective view when a plurality of conductor patterns are overlapped to each other. A conductor pattern 57 is exposed at the end face of a capacitor green body that is the green body of the ceramic body so prepared. Besides the above-mentioned cutting-plane line 72, the conductor patterns are also cut in parallel with a longer side direction L of the conductor patterns.

Step G:

Subsequently, the green body so cut is fired at high temperatures to form a capacitor body. Firing is preferably performed under the following conditions. That is, the temperature is lower than the melting point of a plated film and higher than the recrystallization temperature. The atmosphere has an oxygen content at which the plated film is not oxidized. For instance, when the plated film is Ni, the recrystallization temperature of Ni is 500 to 550° C., and its melting point is 1450° C. Therefore, the firing temperatures should be 1250 to 1350° C. Through these manufacturing steps, the ceramic green sheet becomes the ceramic layer of a multilayer ceramic capacitor, and the conductor patterns of the plated film become a plated conductor layer and a plated dummy conductor layer.

As in this case, due to the firing at a temperature higher than the recrystallization temperature of the plated film, the recrystallization of the plated film proceeds during firing, and metal is suitably softened. As a result, the ceramic powder in the ceramic green sheet 65 enter the surface of the conductor patterns 57 composed of the plated film. This improves the adhesion force between the conductor patterns 57 and the ceramic green sheet 65, thus leading to a strong connection between the after-firing conductor layers 7, 15 and the ceramic layer 5.

In the conductor layers 7 and 15 of the after-firing capacitor body, the one end face forming the external electrodes also shrinks by the heat of the firing, and increases its thickness. As a result, the peripheral edge portions of the conductor layers 7 and 15 have a greater thickness over the entire periphery than their respective inner regions.

Step H:

Lastly, to the end portions at which the conductor layers 7 and 15 of the capacitor body are exposed, an external electrode paste is applied and fired, followed by plating, in order to form external electrodes 3. Thus, the multilayer ceramic capacitor is completed.

Figure 17A:
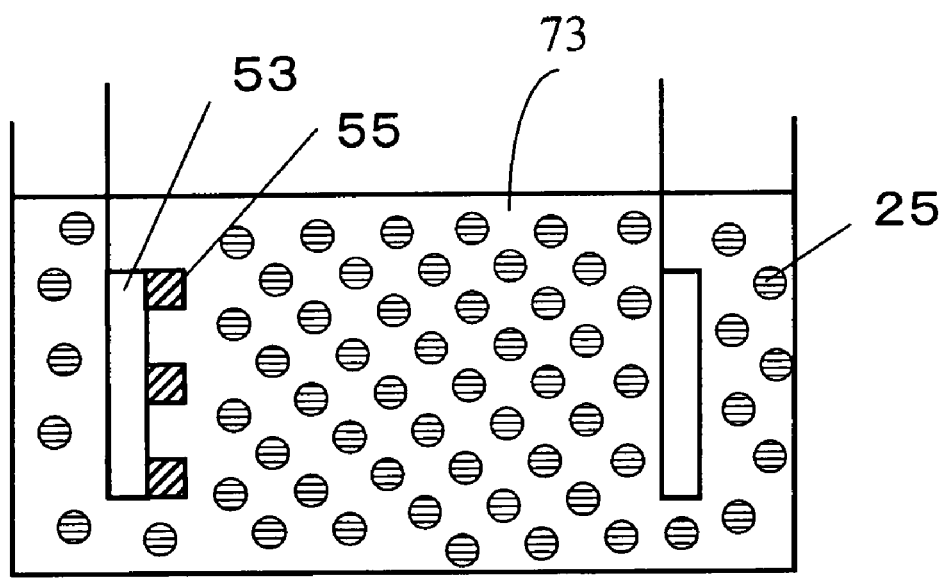
FIGS. 17A and 17B are schematic diagrams illustrating electroplating method with particles dispersed.
Figure 17B:
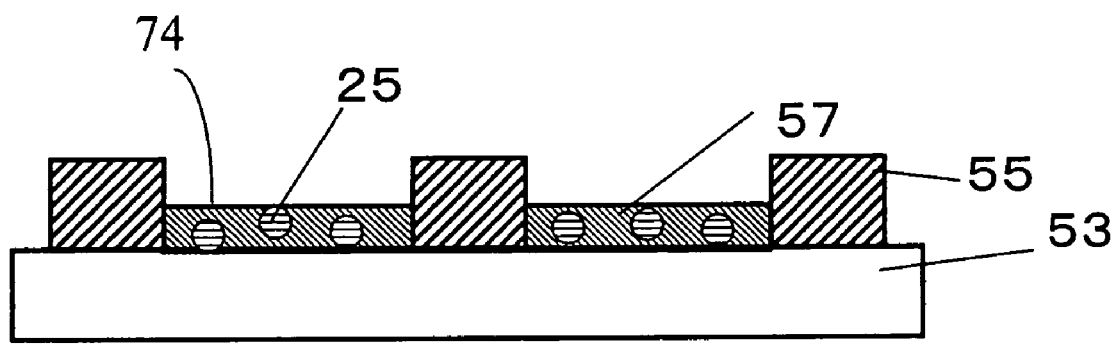
Figure 18:
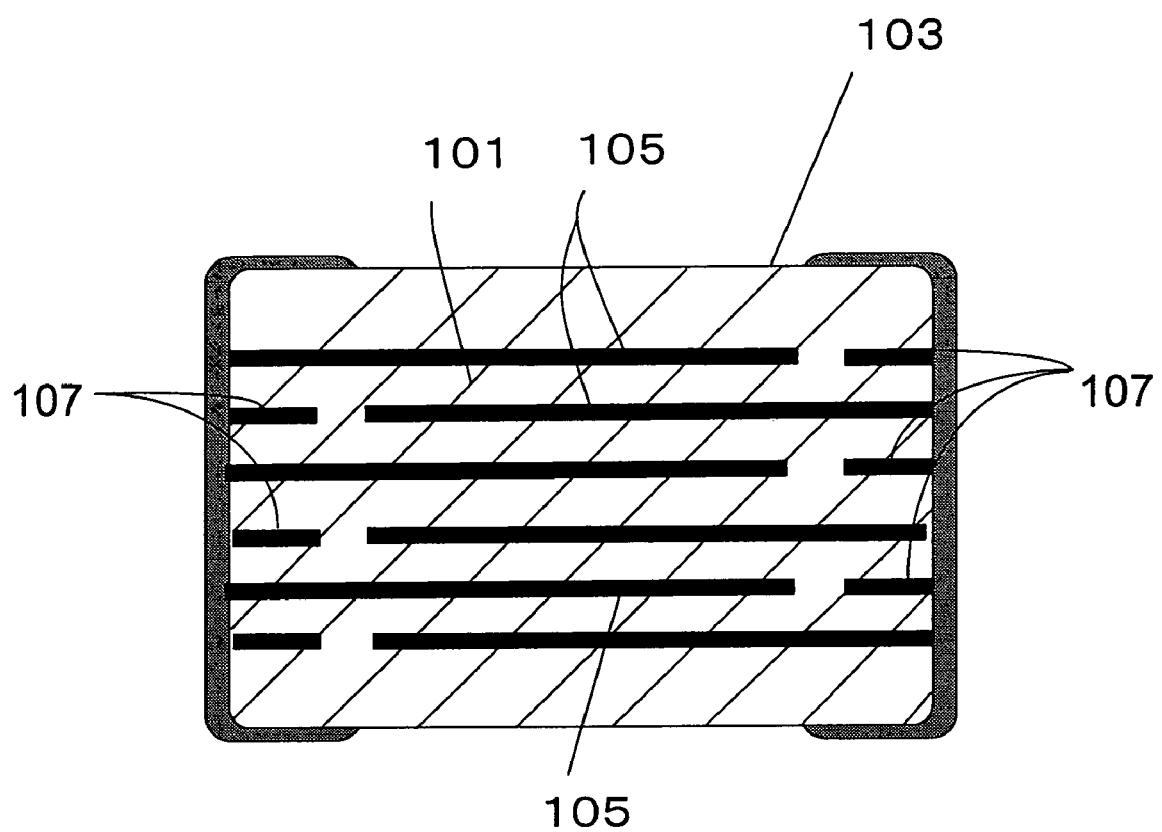
FIG. 18 is a schematic sectional view of a conventional multilayer ceramic capacitor having a dummy conductor layer.

FIGS. 17A and 17B are schematic diagrams illustrating electroplating with particles dispersed. In the electroplating in the step B, by means of electroplating while dispersing the following various particles 25 in a plating bath 73, as shown in FIG. 17A, the dispersed particles 25 can be incorporated into a plated film 74 at the same time the plated film composition is deposited. Needless to say, when various particles are not dispersed, only the plated film 74 can be prepared. As the particles 25 used herein, a variety of particles, such as insulative particles, semiconductor particles and conductive particles, can be used suitably. Specifically, in addition to the above-mentioned acicular crystals, the presence of the particles 25 in the plated film 74 also functions as anchor to the ceramic green sheet, thereby improving adhesion.

When the particles 25 are insulative particles, the connecting property between the conductor layers and the ceramic layer can be readily improved by the sintering with the ceramic layer. A variety of ceramic particles are usable as insulative particles. It is more preferable to use the powder of the main component of the ceramic layer 5 constituting the multilayer ceramic capacitor, because this powder causes less change in the dielectric property of the ceramic layer 5, and it can be formed by the same sintering behavior as the ceramic layer 5.

When the particles 25 are semiconductor particles or conductive particles, anchor effect is produced in the surfaces of the conductor patterns, and its conductivity acts as electrode. This compensates for the decrement of the effective area of the conductor patterns. Semiconductor particles are preferably metal oxide, nitride, carbide, or boride, specifically NiO or $TiO_2$, which are susceptible to the valence change of a metal element, among a variety of ceramic particles.

As conductive particles, it is possible to use a variety of metal particles. It is more desirable to use ones containing the same component as the plated film 74. In this case, since the particles 25 to be added have conductivity, a plated film can also be formed on the particles surfaces at the time of electroplating. Thereby, the effective area of the conductor patterns 57 can be made substantially equal to the outline area.

Since the above-noted insulative particles, semiconductor particles and conductive particles have a spherical or a similar shape, the degree to which the surface area decreases during firing is small, and it is therefore possible to suppress the rate of shrinkage during firing of the whole conductor patterns. This enables to suppress a decrease in the effective area of a conductor layer to be constructed as the electrodes of a multilayer electronic component. For example, in a multilayer ceramic capacitor, a decrease in the effective area of a conductor layer can be minimized. This enables to maintain the effective area and avoid a drop in electrostatic capacity.

In the above-mentioned multilayer electronic component, the maximum particle sizes of insulative particles, semiconductor particles and conductive particles are preferably smaller than the maximum thickness of the conductor patterns. With the above-noted definition of the dimension of the particles contained in the conductor patterns, the deviation due to the dimensions of particles is avoidable, thereby attaining a uniform dispersion in the plane of the conductor patterns, and also a uniform adhesion to the ceramic green sheet in the plane.

The total content of the insulative particles, semiconductor particles and conductive particles in the conductor patterns is preferably 1 to 50 (area %) when the conductor layer is viewed from above. Even when the above-mentioned particles are contained in the conductor pattern, by defining the content thereof as mentioned above, it is possible to ensure sufficient adhesion force between the conductor patterns and the ceramic green sheet, as well as excellent conductivity as electrode, which is inherent in the plated film.

In the foregoing, these particles are dispersed in the plating bath and incorporated into the plated film. Alternatively, as long as the roughness and irregularities of the plated film surface due to the particles cause neither a deterioration in the electric characteristics nor the delamination of the multilayer ceramic capacitor manufactured by firing, it is possible to employ a method of spraying a variety of particles to the surface of a plated film containing no particles, or a method of applying a paste containing a variety of particles onto a plated film by printing method.

Preferably, the conductor patterns of the present invention have in its plane openings 21. The openings can be formed easily by dispersing insulative powder on a mold releasing layer when forming a plated film. Due to the presence of the openings in the plane of the conductor patterns, ceramic powder can enter there. This further increases the adhesion force between the ceramic green sheet and the plated film.

Preferably, the surface of the conductor pattern of the present invention is covered with a metal oxide film. In this case, the after-plating film is heat treated at a temperature higher than room temperature. On the conductor pattern side to be adhered to ceramic particles, the same metal oxide layer as the ceramic particles can be formed, so that the same oxide composition is formed at the interface between the conductor pattern and the ceramic green sheet. In addition to the adhesion during forming, even after firing, the connecting property between the two layers can further be improved.

Preferably, the conductor pattern of the present invention has in its surface anisotropic crystals. These anisotropic crystals can be formed easily by changing the dimension of the crystals of the mold releasing layer.

EXAMPLES

The multilayer electronic components of the present invention will next be described by way of examples and comparative examples. However, it is to be understood that the invention is not limited to the following examples but is susceptible of various changes and modifications within the scope of the invention. The following examples relate to the manufacture of a multilayer ceramic capacitor. However, it is to be understood that the invention is not limited to the multilayer ceramic capacitor but is applicable to other multilayer electronic components.

Example 1

<Manufacturing of Multilayer Ceramic Capacitor without Dummy Conductor Layer>

First, a stainless steel plate was employed as a metal member, and a TiN film having a specific resistance of $10^{-4}$ $\Omega$cm was formed as a mold releasing layer, on the surface of the stainless steel plate. Subsequently, on the mold releasing layer, a mask pattern composed of DLC having a thickness of 1 μm was formed so as to produce a so-called staggered pattern, in which there were rectangular regions 0.9 mm wide and 3.6 mm long that became the region for forming a plated film, and the distance between the adjacent shorter sides of the rectangular regions was the above-mentioned distance G (G=500 μm), and the portion of the distance G was positioned at the center of a longer side (FIG. 11A).

The metal member so constructed was then immersed in a plating solution of nickel sulfamate, followed by electroplating while applying electric field to the metal member. In the plated film so formed, its peripheral edge portion in contact with the mask pattern was thicker than the inner region. The thickness of the inner region was 1 μm.

A Ni-plated film formed on the metal member was temporarily transferred onto a resin carrier film (PET film) having flexibility, to the surface of which adhesive was applied.

On the carrier film to which the Ni-plated film was transferred, a ceramic slurry containing a mixed solvent, in which the weight ratio of ceramic powder having a mean particle size of 0.3 μm and polyvinylbutyral resin to toluene and ethanol was 1:1, was applied and dried, thereby preparing a ceramic green sheet adhered to and integrated with the Ni-plated film. The forming speed was 100 m/min. The thickness of the ceramic green sheet was adjusted to 2.5 μm on the average.

Subsequently, 200 pieces of the ceramic green sheets adhered to and integrated with the Ni-plated film were temporarily laminated while stripping their respective carrier films. Then, an external cover layer was adhered to the upper and lower surfaces of the temporal laminate body, and then pressed while heating at a temperature of 60° C. and a pressure of 0.8 MPa. Thereafter, this was subjected to hydrostatic pressure pressing at a temperature of 70° C. and a pressure of 50 MPa, thereby preparing a laminate body. At this time, the conductor patterns in each layer were shifted about one-half in a longer side direction of the conductor patterns, and the conductor patterns on the shorter side were aligned in the direction of lamination.

The laminate body was then cut with a dicing saw. The cutting plane lines were as shown in FIG. 11A. Specifically, in the longer side direction of the inner conductor patterns, the cutting plane line passes through the substantially center portion between the conductor patterns. In the shorter side direction, the cutting plane line passes through substantially the center of the longer side of the conductor patterns (for the underlayer, it passes through substantially the center between the conductor patterns). Thus, there was prepared a capacitor green body with the conductor patterns exposed to the opposed end faces.

Subsequently, the capacitor green body so cut was fired to obtain the capacitor body of the present invention. The firing temperature was 1300° C., and the atmosphere was reductant. Like the before-firing conductor patterns, the conductor layer formed on the capacitor body had the peripheral edge portion thicker than the inner region. In the ceramic layer surface fired at the above-mentioned temperature, ceramic particles project, and the conductor layer was connected to the ceramic particles so as to follow them. When TiN was used as mold releasing layer in the process of the present invention, anisotropic crystals were observed in the surface of the after-firing conductor layer.

Lastly, to the end faces of the capacitor body at which the conductor layer was exposed, an external electrode paste was applied and fired at a temperature of 700° C. To the surface of this external electrode, Ni and Sn were plated, thereby completing a multilayer ceramic capacitor of the invention. The dimension of the multilayer ceramic capacitor was 1.25 mm wide, 2 mm long, and 1.25 mm thick. In the multilayer ceramic capacitor so manufactured by this method, the conductor layer composed of the plated film was adhered to the surface of the ceramic layer so as to follow it. In other words, it was bonded thereto to such an extent that the plated film enters the open holes in the ceramic layer surface.

Example 2

<Manufacturing of Multilayer Ceramic Capacitor with Dummy Conductor Layer>

A multilayer ceramic capacitor was manufactured, which had a plated-film conductor layer contributing to the formation of capacity, and a plated-film dummy conductor layer on the same plane of a ceramic layer. With regard to the mask pattern in the second step of Example 1, a plated film that became conductor patterns was prepared in the following manner. The thickness of a mask pattern composed of DLC was the same as that of Example 1. Here, the width, the length, and the distance G of the conductor patterns being the plated film were 100 μm. The portion of the distance G, which was the space portion in a longer side direction of the conductor pattern, was disposed at a position drifted to a shorter side from the center in the longer side direction (FIG. 11B). This was a so-called modified staggered pattern. Specifically, in a laminate body according to Example 2, the conductor patterns were arranged such that they were drifted layer by layer from the center to the shorter side, in the longer side direction of the conductor pattern. The laminate body was cut along the cutting-plane lines as shown in FIG. 15B. Other steps were the same as those in Example 1.

Example 3

<Manufacturing of Multilayer Ceramic Capacitor Having Openings in Conductor Layer>

Solvent-solubility resin particles were dispersed into the surface of a mold releasing layer on a metal member with a plated film, followed by electroplating on this surface. Thereafter, the resin particles were dissolved with solvent, thereby forming openings. Other steps were the same as those in Example 2, and a multilayer ceramic capacitor was obtained. The dimension of the openings of the plated film was 20 μm on the average.

Example 4

<Manufacturing of Multilayer Ceramic Capacitor Having Metal Oxide Film on Conductor Layer>

An electroplated-film was formed and then heat treated at 150° C. in the atmosphere, thereby forming a metal oxide film on the surface of a plated conductor layer. Other steps were the same as those in Example 2, and a multilayer ceramic capacitor was obtained.

Example 5-1 to 5-3

<Manufacturing of Multilayer Ceramic Capacitor with Particles Dispersed in Conductor Layer>

A multilayer ceramic capacitor was manufactured, the conductor layer of which contained insulative particles, semiconductor particles and conductive particles. When forming an electroplated film, barium titanate particles as insulative particles, NiO particles or TiN particles as semiconductor particles, and Ni particles as conductive particles were respectively dispersed in a plating bath, followed by electroplating. Their respective maximum particle sizes were smaller than the thickness of an inner region of a plated film. The amount of the particles dispersed was adjusted such that it was not more than 10% of the area of conductor patterns. Other steps were the same as those in Example 2, and a multilayer ceramic capacitor was obtained.

COMPARATIVE EXAMPLE

Electroplating on the entire surface of a mold releasing layer was performed under the same conditions as in Example 1. On this plated film a mask pattern was formed by using a photosensitive resist as in the usual manner. The part of the plated film not provided with the resist film was removed with etching solution, and the rest was used as conductor patterns. The conductor patterns had the same width, length, thickness, and arrangement as Example 1. In the conductor patterns of a multilayer ceramic capacitor so prepared, there was substantially little difference in thickness between the peripheral edge portion and the inner region of the conductor patterns.

<Evaluations>

The following evaluations were performed on the multilayer ceramic capacitors manufactured in Examples 1 to 5, and Comparative Example.

(A) With regard to the manufactured capacitor green body and the capacitor body, delamination and cracks were observed on a stereoscopic microscope. The number of samples was 100 each.

(B) With regard to the multilayer ceramic capacitors, electrostatic capacity, breakdown voltage, and thermal shock test were evaluated. The number of samples was 100 each.

The electrostatic capacity was measured at 1 kHz and 0.6 Vrms. The breakdown voltage was determined by increasing the voltage up to breakdown. In the thermal shock test, the samples were respectively immersed for one minute in plating baths set at 250° C. and 325° C., respectively. The immersed samples were observed as to the presence or absence of delamination and cracks.

The results of measurements were presented in Table 1.

TABLE 1

| | | Delamination and Cracks | | | | | |
| | | Before-Firing Capacitor | After-Firing Capacitor | Thermal Shock Test | | Electrostatic | |
| Samples | Particles Contained into Plating Layer | Green Body pieces/100 | Body pieces/100 | 250° C. pieces/100 | 325° C. pieces/100 | Capacity μF | Breakdown Voltage V |
|---|---|---|---|---|---|---|---|
| Comparative Example* | Nothing | 14 | 22 | 6 | 11 | 4.9 | 240 |
| Example 1 | Nothing | 0 | 0 | 1 | 2 | 4.9 | 230 |
| Example 2 | Nothing | 0 | 0 | 0 | 1 | 4.9 | 220 |
| Example 3 | Nothing | 0 | 0 | 0 | 0 | 4.9 | 220 |
| Example 4 | Nothing | 0 | 0 | 0 | 0 | 4.9 | 220 |
| Example 5-1 | Insulative Particles | 0 | 0 | 0 | 0 | 4.75 | 220 |
| Example 5-2 | Semiconductor Particles | 0 | 0 | 1 | 1 | 4.8 | 200 |
| Example 5-3 | Conductive Particles | 0 | 0 | 2 | 4 | 4.85 | 190 |

*Comparative Example is a sample that there was substantially no difference in thickness between the peripheral edge portion and the inner region of the conductor patterns.

As apparent from the results in Table 1, in Examples 1 to 5, the maximum 4/100 pieces of delamination or cracks were observed in the thermal shock test, while the before-firing capacitor green body and the after-firing capacitor body were free of delamination and cracks. Additionally, in Examples 1 to 5, their respective electrostatic capacity was not less than 4.75 μF, and the breakdown voltage was not less than 190 V. In contrast, delamination or cracks were observed before firing and after firing in Comparative Example in which the peripheral edge portion of the conductor layer was not thicker than the inner region.

What is claimed is:

1. A multilayer electronic component composed of a ceramic body obtained by laminating a plurality of ceramic layers via a conductor layer, the conductor layer being a plated film and extended to one end face of the ceramic body, thereby contributing to a formation of capacity, wherein a peripheral edge portion all over the circumference of the conductor layer composed of the plated film is formed in a greater thickness than its inner region, and t1/t2 is 1.1 or more, wherein the peripheral edge portion is t1 and the inner-region is t2.

2. The multilayer electronic component according to claim 1 wherein
the plurality of ceramic layers has a sintered surface in which a plurality of ceramic particles are joined via grain boundaries, and
the conductor layer adheres to the sintered surface of the ceramic layer.

3. The multilayer electronic component according to claim 1 wherein a mean particle size of ceramic particles in the sintered surface is not more than 0.5 μm.

4. The multilayer electronic component according to claim 1, wherein the conductor layer has openings.

5. The multilayer electronic component according to claim 1 wherein a metal oxide film is formed on the surface of the conductor layer.

6. The multilayer electronic component according to claim 1 wherein anisotropic crystals are present in the surface of the conductor layer.

7. The multilayer electronic component according to claim 1 wherein the conductor layer contains therein at least one of insulative particles, semiconductor particles and conductive particles.

8. The multilayer electronic component according to claim 7 wherein the maximum particle size of insulative particles, semiconductor particles and conductive particles is smaller than a maximum thickness of the conductor layer.

9. The multilayer electronic component according to claim 7 wherein the conductor layer contains therein at least one of insulative particles, semiconductor particles and conductive particles, and the total content of insulative particles, semiconductor particles and conductive particles in the conductor layer is 1 to 50 (area %) when the conductor layer is viewed from above.

10. A multilayer electronic component composed of a ceramic body obtained by Laminating a plurality of ceramic layers via a conductor layer, the conductor layer being extended to one end face of the ceramic body and contributing to a formation of capacity, and a dummy conductor layer formed at a distance and being extended to an opposite end face; and the conductor layer and the dummy conductor layer being composed of a plated film, wherein a peripheral edge portion all over the circumference of one or both of the conductor layer and the dummy conductor layer is formed in a greater thickness than its inner region, and t1/t2 is 1.1 or more, wherein the peripheral edge portion is t1 and the inner region is t2.

11. The multilayer electronic component according to claim 10 wherein
the plurality of ceramic layers has a sintered surface in which a plurality of ceramic particles are joined via grain boundaries, and
the conductor layer and/or the dummy conductor layer adheres to the sintered surface of the ceramic layer.

12. The multilayer electronic component according to claim 10 wherein the conductor layer and the dummy conductor layer have openings.

13. The multilayer electronic component according to claim 10 wherein a metal oxide film is formed on the surfaces of the conductor layer and the dummy conductor layer.

14. The multilayer electronic component according to claim 10 wherein anisotropic crystals are present in the surfaces of the conductor layer and the dummy conductor layer.

15. The multilayer electronic component according to claim 10 wherein the conductor layer and the dummy conductor contain therein at least one of insulative particles, semiconductor particles and conductive particles.

16. The multilayer electronic component according to claim 15 wherein a maximum particle size of insulative particles, semiconductor particles and conductive particles is smaller than a maximum thickness of the conductor layer and the dummy conductor layer.

17. The multilayer electronic component according to claim 16 wherein the conductor layer contains therein at least one of insulative particles, semiconductor particles and conductive particles, and the total content of insulative particles, semiconductor particles and conductive particles in the conductor layer is 1 to 50 (area %) when the conductor layer is viewed from above.

* * * * *